United States Patent [19]
Cochran

[11] 3,951,783
[45] Apr. 20, 1976

[54] FACE SEAL FOR SPHERICAL SURFACE
[75] Inventor: Thomas Eugene Cochran, Yorkville, Ill.
[73] Assignee: Caterpillar Tractor Co., Peoria, Ill.
[22] Filed: Nov. 18, 1974
[21] Appl. No.: 524,717

[52] U.S. Cl. .............................. 308/187.1
[51] Int. Cl.² ........................................ F16C 33/78
[58] Field of Search............ 308/187, 187.1, 187.2, 308/36.1; 277/92, 170, 171

[56] References Cited
UNITED STATES PATENTS
2,619,369  11/1952  Williams .................... 308/187.1 X
3,403,916  10/1968  Durham et al. ............. 308/187.1 X
3,645,591   2/1972  Winberg ..................... 308/187.1

Primary Examiner—Robert J. Spar
Assistant Examiner—Randolph A. Reese
Attorney, Agent, or Firm—Phillips, Moore, Weissenberger, Lempio & Strabala

[57] ABSTRACT

A resiliently supported face seal arrangement with arcuate seal rings that coact with spaced spherical ramps of a bearing mounting to maintain an effective seal and thus a lube chamber and supply for components with relatively large angular misalignment is disclosed.

5 Claims, 1 Drawing Figure

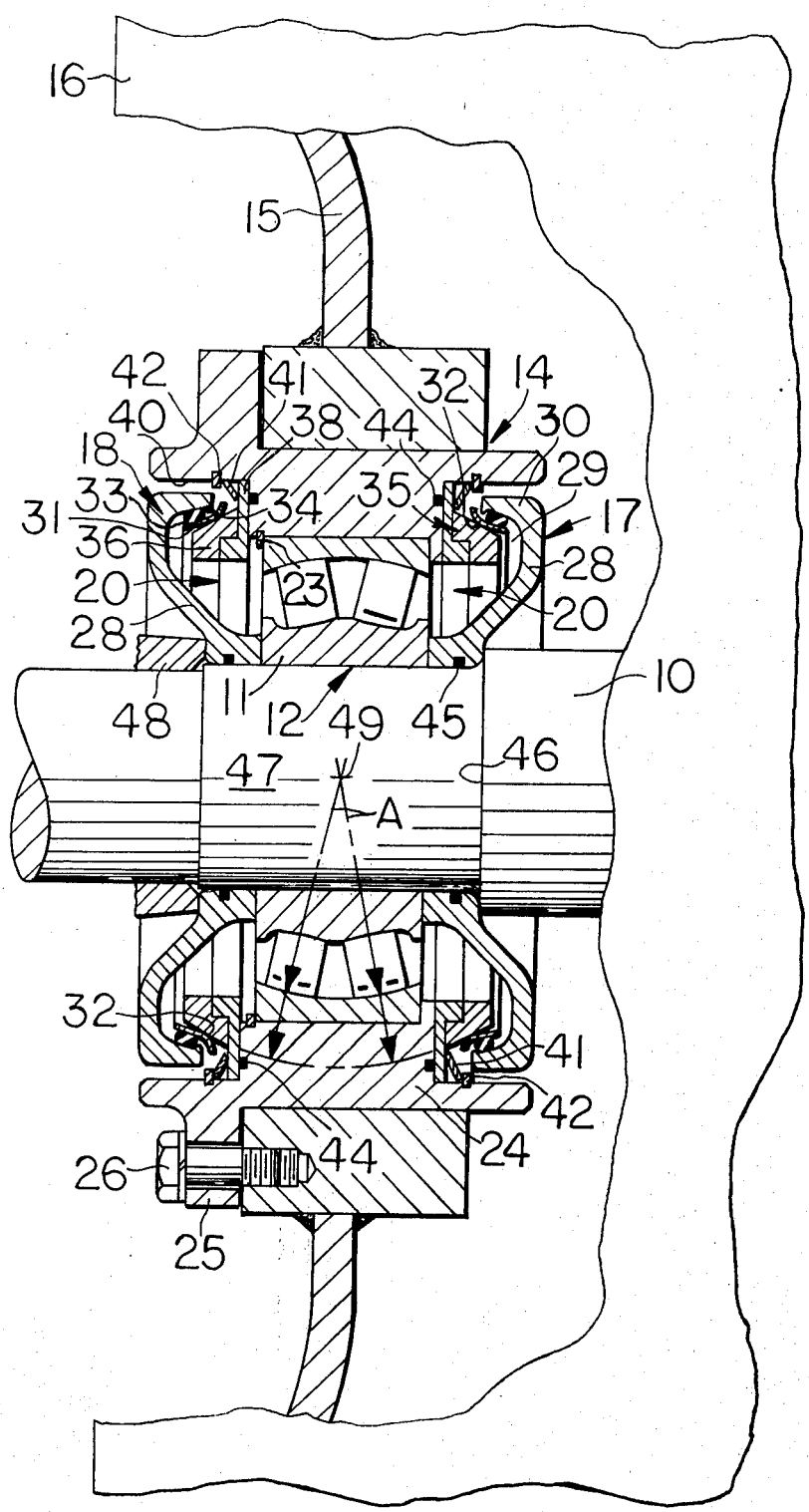

FACE SEAL FOR SPHERICAL SURFACE

BACKGROUND OF THE INVENTION

The invention relates to a resiliently supported face seal arrangement with arcuate seal rings that coact with spaced ramps of a bearing mounting to maintain an effective seal and to provide a lube chamber and lubricant supply for components which undergo relatively large angular misalignment. The arrangement is particularly useful with heavy-duty equipment such as tractor compactors.

PRIOR ART

The prior art disclose a number of arrangements useful for supporting bearings and the like. Typical examples of such arrangements may be found for example in U.S. Pat. Nos. 3,408,084; 3,497,176; 3,501,158; 3,554,101; 3,633,471; and 3,752,509.

The outer support and bearing seal arrangements employed on heavy-duty equipment such as tractor compactor wheels are often difficult and costly to maintain. The heavy weight of the vehicle, the harsh compaction application and the build up and binding of mud and rock between the compaction pads and cleaner bars for these pads jointly act to apply detrimentally high stress loads and forces on the outer support bearings and seal arrangements. Thus, it is highly desirable to provide an outer support bearing and seal arrangement which is effective for maintaining lubricant about the bearing through relatively large angular misalignment of the parts thereof due to heavy-duty use. It is further desirable that such outer support bearing and seal arrangement not include critically aligned metal-to-metal face seals, since these can only accomodate limited misalignment because of the precision ground mating faces therebetween.

It is further desirable that such seals be relatively economical to produce and service and that they require little or no maintenance.

Accordingly, it is an object of the invention to provide an outer support bearing and seal arrangement which prevents loss of bearing lubricant due to relatively large angular misalignment of the bearing, which arrangement does not involve precision ground mating metal-to-metal face seals and which arrangement is relatively economical to produce and service and requires little or no maintenance.

SUMMARY OF THE INVENTION

Broadly, the invention comprises an arrangement for resiliently supporting a bearing, which includes an inner race supported by a shaft and an outer race communicating with said arrangement, while preventing loss of bearing lubricant through relatively large angular misalignment of said shaft relative to said arrangement. The arrangement comprises a pair of circular channel defining members, one on each side of the bearing, the members being sealingly journaled to the shaft axially thereof with the therein defined channels facing one another. A pair of convexly surfaced ramps supported on each side of the bearing by the outer race thereof are axially disposed from the shaft, the convex surfaces of each ramp facing the nearer of the members. A pair of resilient seal rings are axially disposed from the shaft in contact with the convex surfaces of the ramps. A pair of elastomeric tori are axially disposed from the shaft in contact with the members and the seal rings to bias the convex surfaces of the ramps against the seal rings.

BRIEF DESCRIPTION OF THE DRAWINGS

The drawing illustrates in partial sectional view the preferred embodiment of the outer support bearing and seal arrangement of the invention.

DETAILED DESCRIPTION OF THE PREFERRED EMBODIMENT

With particular reference to the drawing, a shaft 10 is illustrated in supportive contact with an inner race 11 of a bearing 12. The bearing is supported by a mounting structure 14 which is supported in turn, for example, by an outer face 15 of a tractor compactor wheel 16.

Seal arrangements 17 and 18 are provided, one on each side of the bearing 12. The seal arrangements are capable of tolerating substantial misalignment and of maintaining a supply of lubricant in a chamber 20 located therein. To accomodate heavy loads and resulting angular misalignment of components, the bearing is preferably a spherical or other comparable self-aligning type. The bearing is contained by a lock ring 23 within an annular collar 24 that is secured to the mounting structure 14 by a flange 25 and a plurality of bolts 26.

The seal arrangements 17 and 18 each comprises a cicular channel defining member 28, defining a channel 29. The member is sealingly journaled on the shaft 10. A pair of outer peripheral axial flange portions 30, one for each circular channel defining member, each resiliently supporting a seal ring 31 with a convex arcuate sealing face 32 through elastomeric tori 33. At the ends of the flange portions 30 are ridges 34 which serve to align the elastomeric tori and keep them in place. A pair of convexly surfaced ramping structures 35, comprising convex spherical ramps 36 mounted on radially extending members 38 sit telescopically within the flange portions to have their convex faces 36 abut and coact with the seal rings 31. More particularly, the convex faces of the support seal rings are biased by the elastomeric tori to abut and coact with the convex spherical ramps. The convex spherical ramps and the radially extending members are radially and axially contained within the bores 40 at each end of the collar 24 by the spring 41 and the lock ring 42. Additional elastomeric tori seals 44 are provided to the rear of each radially extending member and additional elastomeric tori seals 45 are provided between the circular channel defining members and the shaft to prevent leakage.

Assembly, and likewise disassembly of the seals and bearings is readily accomplished. Initially, circular channel defining member 28 of seal 17 is fitted on shaft 10 so it abuts a shoulder 46 thereof. Collar 24 with bearing assembly 12 and pre-assembled convexly surfaced ramping structure 35 is then inserted in mounting 14 and secured by bolts 26.

Lastly, circular channel defining members 28 of the second or other seal arrangement 18 is fitted to shaft portion 47 and secured axially by a ring-like member 48. The axial force applied by elastomeric tori 33 upon the seal rings 31 maintains faces 32 in abutting sealing contact with convex spherical ramps 36 through the entire range of angular misalignment allowed by bearing 12. As indicated by radii shown at A, this extensive effective sealing range is made possible by forming and spacing the convex spherical ramps axially such that their surfaces remain concentrically disposed with the seal faces. This concentric disposition is independent of the amount of angular misalignment which occurs and of distortion of any member of the arrangement. It is highly desirable that the spherical ramps be spherical about the center of the shaft 10 and more particularly about a point 49 centrally of the bearing and of the shaft. Such construction allows for great flexing of the arrangement shaft and bearing while the seal remains firm throughout this flexing.

While the invention has been described in connection with specific embodiments thereof, it will be understood that it is capable of further modification, and this application is intended to cover any variations, uses or adaptations of the invention following, in general, the principles of the invention within known or customary practice in the art to which the invention pertains and as may be applied to the essential features hereinbefore set forth, and as fall within the scope of the invention and the limits of the appended claims.

What is claimed is:

1. An arrangement for resiliently supporting a bearing which includes an inner race supported by a shaft and an outer race communicating with said arrangement, while preventing loss of bearing lubricant through relatively large angular misalignment of said shaft relative to said arrangement, comprising:

a pair of circular channel defining members, one on each side of said bearing, said members being sealingly journaled to said shaft axially thereof with the channels therein defined facing one another;

a pair of convexly surfaced ramps supported on each side of said bearing by the outer race thereof axially disposed from said shaft, the convex surfaces of each ramp facing the nearer of said members;

a pair of resilient seal rings axially disposed from said shaft having a convex and concave side with the convex side thereof in contact with a respective convex surface of a respective ramp; and a pair of elastomeric tori axially disposed from said shaft, each in contact with a respective member and the concave side of a respective seal ring to bias said convex surfaces of said ramps against said convex surfaces of said seal rings.

2. An arrangement as in claim 1 wherein said convexly surfaced ramps are spherically convex.

3. An arrangement as in claim 2 further characterized in that said members each include an outer peripheral flange portion inwardly extending therefrom relative to said bearing, said flange portion serving to position said tori.

4. An arrangement as in claim 3, wherein said bearing comprises a spherical self aligning bearing.

5. An arrangement as in claim 4 including a ridge at the periphery of said flange portion to align said tori.

* * * * *